(12) United States Patent
Weber et al.

(10) Patent No.: US 8,887,124 B2
(45) Date of Patent: Nov. 11, 2014

(54) VALIDATION OF PROCESS MODELS

(75) Inventors: Ingo Weber, Kensington (AU); Christian Quanz, Frankfurt (DE); Joerg Hoffmann, Saarbruecken (DE)

(73) Assignee: SAP SE, Walldorf, DE (US)

( * ) Notice: Subject to any disclaimer, the term of this patent is extended or adjusted under 35 U.S.C. 154(b) by 1425 days.

(21) Appl. No.: 12/570,828

(22) Filed: Sep. 30, 2009

(65) Prior Publication Data
US 2011/0078650 A1 Mar. 31, 2011

(51) Int. Cl.
*G06F 9/44* (2006.01)
*G06Q 10/06* (2012.01)

(52) U.S. Cl.
CPC ................ *G06Q 10/06* (2013.01)
USPC .................. 717/104; 717/126; 717/128

(58) Field of Classification Search
USPC ............................................. 717/104
See application file for complete search history.

(56) References Cited

U.S. PATENT DOCUMENTS

| | | | | |
|---|---|---|---|---|
| 5,394,347 | A * | 2/1995 | Kita et al. | 703/2 |
| 6,577,981 | B1 * | 6/2003 | Grey et al. | 702/119 |
| 7,882,057 | B1 * | 2/2011 | Little et al. | 706/60 |
| 2006/0212836 | A1 | 9/2006 | Khushraj et al. | |
| 2007/0094060 | A1 * | 4/2007 | Apps et al. | 705/7 |
| 2007/0094211 | A1 * | 4/2007 | Sun et al. | 706/50 |
| 2007/0219941 | A1 * | 9/2007 | Schnurr et al. | 707/1 |
| 2008/0082302 | A1 * | 4/2008 | Samardzija et al. | 703/2 |
| 2009/0113394 | A1 | 4/2009 | Weber et al. | |

OTHER PUBLICATIONS

Ankolekar et al, "Towards a Formal Verification of OWL-S: Process Models", In Fourth International Semantic Web Conference, 2005, 15 pages.
Awad et al, "Efficient Compliance Checking Using BPMN-Q and Temporal Logic", Proceedings of the Sixth International Conference on Business Process Management (2008), pp. 326-341.
Brat et al, "Combining Static Analysis and Model Checking for Software Analysis", 16th IEEE International Conference on Automated Software Engineering (2001), 8 pages.
Fisteus et al, "Applying Model Checking to BPEL4WS Business Collaborations", Proceedings of the ACM Symposium on Applied Computing (2005), pp. 826-830.
Fu, et al, "Analysis of Interacting BPEL Web Services", Proceedings of the 13th International Conference on World Wide Web (2004), pp. 621-630.
Fuxman, A. D., "Formal Analysis of Early Requirements Specifications", 2001, 113 pages.
Godefroid, P., "Partial-Order Methods for the Verification of Concurrent Systems: An Approach to the State-Explosion Problem", Springer-Verlag New York, Inc., (1996), pp. 1-134.

(Continued)

*Primary Examiner* — Henry Tsai
*Assistant Examiner* — John Roche
(74) *Attorney, Agent, or Firm* — Brake Hughes Bellermann LLP (57) ABSTRACT

In computer-implemented methods to validate process models, the models carry semantic information that is related to the process steps, including pre-conditions that indicate whether a step would be executable under certain conditions and post-conditions relating to results from executing a step. Steps are related as predecessor/successor so that a post-condition of the predecessor step can be the pre-condition of a successor step. During model validation, variables are exchanged and propagated between the step conditions. Instead of validating the model for potentially all initial values of variables and conditions, the system identifies portions of the model that can be validated separately for a reduced set of initial states.

16 Claims, 7 Drawing Sheets

(56) References Cited

OTHER PUBLICATIONS

Janssen et al., "Verifying Business Processes using SPIN", Proceedings of the 4th International SPIN Workshop (1998), pp. 21-36.
Kovalyov et al., "A Polynomial Algorithm to Compute the Concurrency Relation of Free-choice Signal Transition Graphs", In Proceedings of the International Workshop on Discrete Event Systems, vol. 1 (1995), 13 pages.
Kazhamiakin et al., "Formal Verification of Requirements using SPIN: A Case Study on Web Services", Proceedings of the Second International Conference on Software Engineering and Formal Methods (2004), pp. 406-415.
Liu et al., "A Static Compliance Checking Framework for Business Process Models", IBM Systems Journal, vol. 46, Issue 2 (2007), 34 pages.
McMillan, K. L., "Symbolic Model Checking: An Approach to the State Explosion Problem", PhD Thesis (May 1992), pp. 1-212.
Nakajima, S., "Verification of Web Service Flows With Model-Checking Techniques", Proceedings of First International Symposium on Cyber Worlds (2002), pp. 378-385.
Narayanan et al., "Simulation, Verification and Automated Composition of Web Services", Proceedings of the 11th International Conference on World Wide Web (2002), pp. 77-88.
Ribeiro et al., "Translating Synchronous Petri Nets into PROMELA for Verifying Behavioural Properties", International Symposium on Industrial Embedded Systems (2007), pp. 266-273.
van der Aalst, W.M.P, "Verification of Workflow Nets", Proceedings of the 18th International Conference on Application and Theory of Petri Nets, LNCS vol. 1248 (1997), 21 pages.
van der Aalst, W.M.P., et al, "Workflow Patterns", Distributed and Parallel Databases, vol. 14, No. 1 (Jul. 2003), 70 pages.
Vanhatalo et al., "The Refined Process Structure Tree", Proceedings of the 6th International Conference on Business Process Management, LNCS vol. 5240 (Sep. 2008), pp. 100-115.
Vanhatalo et al., "Faster and More Focused Control-Flow Analysis for Business Process Models Through SESE Decomposition", Proceedings of the 5th international conference on Service-Oriented Computing, LNCS vol. 4749 (2007), 17 pages.
Vaz et al., "Towards Automated Verification of Web Services", International Association for Development of the Information Society (IADIS) International Conference (Oct. 2007), 9 pages.
Verbeek et al., "Diagnosing Workflow Processes Using Woflan", The Computer Journal, vol. 44 (2001), 34 pages.
Weber et al., "Beyond Soundness: On the Semantic Consistency of Executable Process Models", In Sixth IEEE European Conference on Web Services (2008), pp. 102-111.
Winslett, M., "Reasoning About Action Using a Possible Models Approach", In Seventh National Conference on Artificial Intelligence (1988), pp. 89-93.
Zhao, et al., "Towards the Formal Model and Verification of Web Service Choreography Description Language", Third International Workshop on Web Services and Formal Methods (2006), pp. 1-16.
Bonatti, P., et al, "Rule-based Policy Specification: State of the Art and Future Work", REWERSE Project No. IST-2004-506779 (Sep. 4, 2004), 172 pages.
Ly, L. T., et al, "Semantic Correctness in Adaptive Process Management System", LNCS vol. 4102 (2006), pp. 193-208.
Weber, Ingo et al., "Semantic Business Process Validation", 3rd International Workshop on Semantic Business Process Management, (2008), 36 pages.
Mendling, "Detection and Prediction of Errors in EPC Business Process Models", Dissertation, Institute of Information Systems and New Media, Vienna University of Economics and Business Administration, May 22, 2007, 362 pages.
Non-Final Office Action for U.S. Appl. No. 11/932,730, mailed Mar. 29, 2012, 20 pages.
Advisory Action for U.S. Appl. No. 11/932,730, mailed Nov. 28, 2012, 7 pages.
Restriction Requirement for U.S. Appl. No. 11/932,730, mailed Dec. 8, 2011, 6 pages.
Non-Final Office Action for U.S. Appl. No. 11/932,730, mailed May 8, 2013, 13 pages.
Non-Final Office Action Response for U.S. Appl. No. 11/932,730, filed Jun. 29, 2012, 14 pages.
Final Office Action Response for U.S. Appl. No. 11/932,730, filed Nov. 6, 2012, 16 pages.
Final Office Action for U.S. Appl. No. 11/932,730, mailed Sep. 20, 2012, 12 pages.
RCE for U.S. Appl. No. 11/932,730, filed Dec. 4, 2012, 3 pages.
Restriction Requirement Response for U.S. Appl. No. 11/932,730, filed Jan. 9, 2012, 1 page.

* cited by examiner

VALIDATION OF PROCESS MODELS

TECHNICAL FIELD

The description generally relates to computer systems, and, more in particular, relates to computer systems that validate process models.

BACKGROUND

Organizations, such as companies, enterprises, and governments, execute processes with activities, tasks, business functions, and other operations that are collectively referred to as process steps.

In general, processes can be represented by process models that describe the interrelation between the steps.

More in particular, companies and enterprises execute business processes that are represented by business process models.

The models are stored and documented in a variety of forms and media, that range, for example, from traditional instructions on paper to modern computer-code in modeling languages.

User interfaces enable creation and modification of the computer-coded models by human users. There are many computer techniques available to present models graphically to the users as diagrams, flowcharts, or the like, to store models in repositories, and to let users create or modify the models.

The process steps may be executed (or performed) manually by humans, for example, by employees of the enterprise, or more and more automatically may be executed in whole or in part by machines that include computers.

With the rise of the so-called Service Oriented Architecture (SOA) of computer systems, process activities are getting more and more encapsulated in services, such as in web services. Therefore, the process models have become the backbones and fundamental control elements for complex software systems that arrange process execution by calling the services.

To stay with the example of the enterprises, these organizations need to quickly react to changing market situations, and consequently need to create new business processes or modify existing ones within short time. Similar requirements apply to organizations and processes in general.

However, the underlying models, especially the models implemented by computers, are usually created and modified with collaboration between persons that are process domain experts and persons that are computer domain experts.

Potential misunderstanding between the experts in both domains can lead to incorrect process execution. There is a trend to improve the user interfaces so that the computers can be operated by the process domain experts, who become process designers or modelers.

But still, human experts introduce errors, and before running a process (or, in other words, before deploying its model) it is important to validate the model, and thereby to verify the executability of the process (i.e. if the process can be executed without faults or not).

There are different validation aspects, such as to look at the control flow, or to check the semantic consistency of model and process, and so on.

Validation tools are usually implemented as computer programs that receive the model, for example, in the above-mentioned code in a modeling language. For example, the tools can visit each step of the model from the first to the last step, and check if the execution of the steps is possible.

However, such validation runs may be expensive in terms of computer processing time. Very often, it would not be possible to analyze the model within so-called low-order polynomial time over the input size. From an economic point of view, the business processes would not become available for execution within a sufficiently short time. If model validation requires hours to execute, process designers might decide to skip validation, which would then put the execution of the process at risk.

SUMMARY

Example embodiments allow a computer system to validate process models within a short processing time. Model validation includes identification by the computer system of portions of the model for which corresponding sections of the process could not be executed, or could not be executed correctly.

For example, the models may carry semantic information that is related to the steps, including pre-conditions that indicate whether steps would be executable under certain conditions, and post-conditions relating to results from executing the steps. In a process flow, steps may be related as predecessor/successor, so that a post-condition of the predecessor step can be the pre-condition of a successor step (there can be multiple successors). In other words, the model has nodes that are associated with process steps, and has edges that are associated with the flow of execution from predecessor steps to successor steps.

According to one general aspect, during model validation, variables are exchanged and propagated between the step conditions. Instead of validating the model for potentially all initial values of variables and conditions, the system identifies portions of the model that can be validated separately for a reduced set of initial states.

According to another general aspect, the system propagates variables through the model beginning at a start node, to identify steps for which variable values would not be available (or not defined) prior to step execution, so that the pre-condition would not be defined.

Thus, a method for operating a computer system, with processor and memory, may include obtaining a process model. The model may have (a) a directed graph with nodes that are associated with process steps, and with edges that are associated with a flow of execution from predecessor steps to successor steps, (b) boolean pre-conditions and post-conditions, such that a post-condition of a predecessor step of the predecessor stepscan be the pre-condition for execution of a successor step of the successor steps, and (c) boolean variables to determine logical values of the conditions. The method also may include detecting dependencies between variables that are required to determine the logical values of the pre-conditions, splitting the model into sub-models so that dependent variables remain within sub-models, and checking the flow of execution with pre-conditions and post-conditions for possible combinations of the dependent variables for each sub-model separately.

A computer program product, tangibly embodied on a computer-readable medium, may be configured to cause a data processing apparatus to obtain a process model, the model having (a) a directed graph with nodes that are associated with process steps, and with edges that are associated with a flow of execution from predecessor steps to successor steps, (b) boolean pre-conditions and post-conditions, such that a post-condition of a predecessor step of the predecessor steps can be the pre-condition for execution of a successor step of the successor steps, and (c) boolean variables to determine logical values of the conditions. The product may be further configured to detect dependencies between variables that are required to determine the logical values of the pre-conditions, split the model into sub-models so that dependent variables remain within sub-models, and check the flow of execution with pre-conditions and post-conditions for possible combinations of the dependent variables for each sub-model separately.

A system may include instructions recorded on a computer readable medium. The system may include a model input manager (MIM) configured to obtain a process model having (a) a directed graph with nodes that are associated with process steps, and with edges that are associated with a flow of execution from predecessor steps to successor steps, (b) boolean pre-conditions and post-conditions, such that a post-condition of a predecessor step of the predecessor steps can be the pre-condition for execution of a successor step of the successor steps, and (c) boolean variables to determine logical values of the conditions. The system also may include a model checking engine configured to detect dependencies between variables that are required to determine the logical values of the pre-conditions, to split the model into sub-models so that dependent variables remain within sub-models, and to check the flow of execution with pre-conditions and post-conditions for possible combinations of the dependent variables for each sub-model separately.

The details of one or more implementations are set forth in the accompanying drawings and the description below. Other features will be apparent from the description and drawings, and from the claims.

BRIEF DESCRIPTION OF THE DRAWINGS

FIG. 2 includes FIGS. 2A, 2B, and 2C and is a first example process model according to an example embodiment.

DETAILED DESCRIPTION

Figure 1:
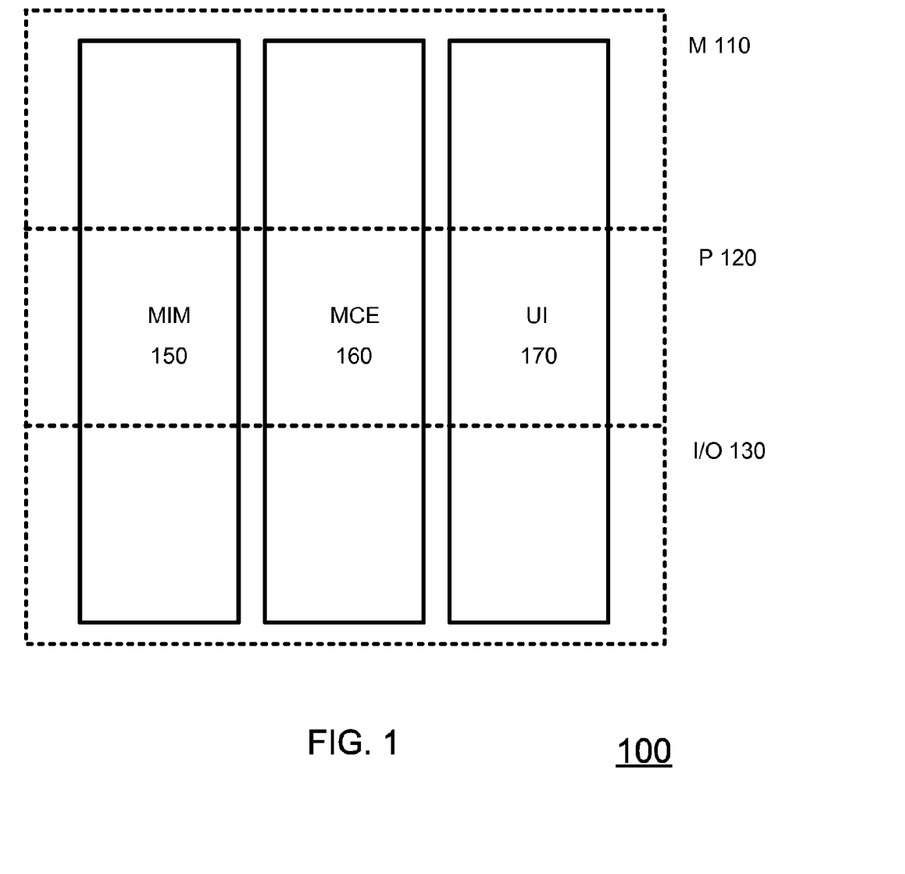
FIG. 1 is a block diagram of a computer system with model validation functionality.
Figure 2A:
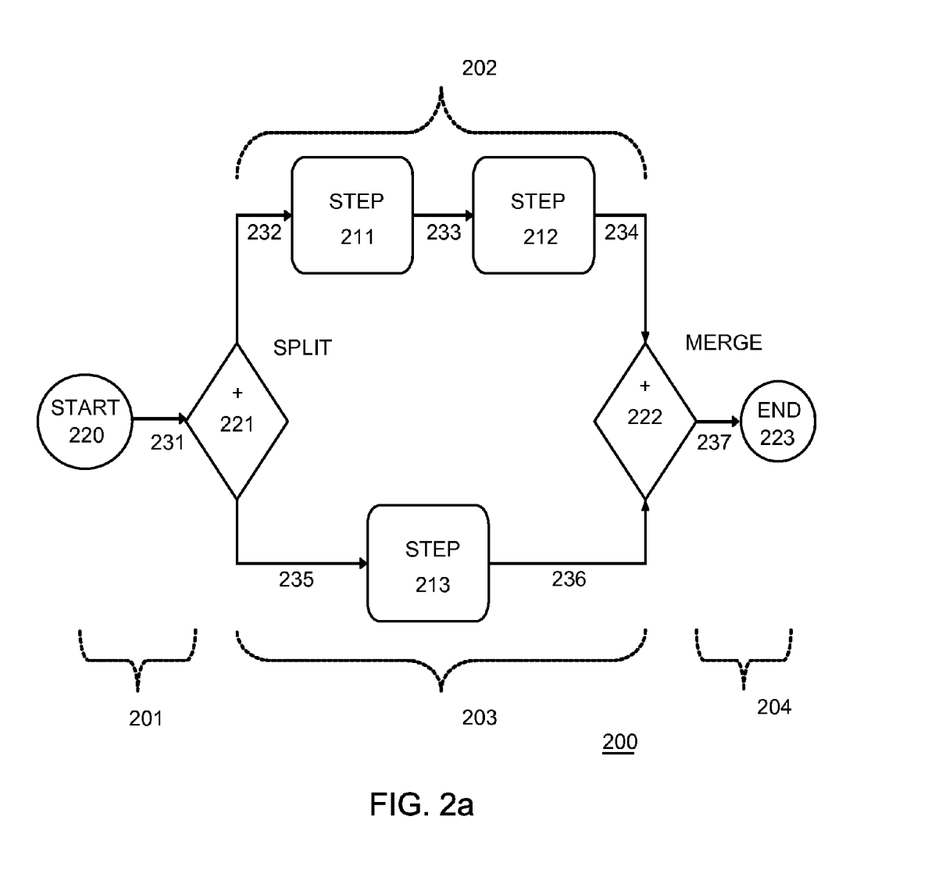

The description initially refers to writing conventions and then turns to the figures for explaining a computer system (FIG. 1) and an example process model (FIG. 2a). In connection with FIGS. 2b and 2c, the model will be explained in view of a business process, for illustration with a consistent step order and with an order that is inconsistent. Thereafter, the description then introduces two approaches according to the mentioned general aspects: initial state reduction (FIGS. 3-4), and variable propagation through annotations (FIG. 5).

The description will occasionally refer to the boolean (or logical, or binary) values "true" and "false" of variables. As persons of skill in the art understand, example implementations may distinguish logical values at various levels, for example, by definitions in programming languages or by distinctive quantities for voltage, charge, current and so on in memory and in processing units.

References to "true" or "false" are therefore just labels that are conveniently used herein to distinguish a "first logical value" from its opposite "second logical value".

Variables that can have either logical value are denoted by uppercase letters, such as variables A, B, and C. A variable having the logical value "true" can be denoted by an lower-case letter, for example by the letter "a"; while a "false" variable can be denoted with a slash "/" and a lower-case letter, for example as in "/a".

Further, in logical statements that in example embodiments are part of the conditions, the operators such as OR (logical disjunction) and AND (logical conjunction) appear in uppercase letters. The logical statements are given in conjunctive normal form (CNF). Simplified, a CNF is a conjunction (AND) of disjunctions (OR) and variables. For example, the CNF (A OR B) AND C contains the disjunction (A OR B) and the variable C.

Variables determine logical values of the conditions. The example CNF assumes the logical value "true" if (A OR B) is "true" AND if C is "true" (i.e. C=c), otherwise the logical value is "false".

As used herein, the "true" value of a condition indicates that a step can be executed, and the "false" value indicates that the step can not be executed.

Combinations of variables are given in braces { }. According to the above introduced convention, uppercase letters indicate that variables are combined having either logical values, such as in {A B C}. Lowercase letters indicate concrete logical values, for example, {a b /c} indicates that variables A and B are "true" and that variable C is "false" (C=/c).

The symbol "⊥" is a placeholder for variables for that a logical value is not yet available. For example, in {a ⊥ c} the variables A and C are "true", but the variable B is not yet available.

Models will be described by referring to graphs with nodes and edges. Graphs are conveniently used to describe the operation of computers; and graphs are often illustrated by diagrams as in this document. However, embodiments do not necessarily need to present such graphs to a human user; the graphs are rather convenient placeholders for information that a computer system processes when validating the models.

Since example embodiments use nodes and edges with specialized functions, the description distinguishes nodes by using terms such as, for example, circle, start/end structure, diamond, merge/split structure, rectangle, or step. For the same reason, edges are sometimes referred to as arrow or link.

The description also distinguishes between process and model. A process is executed with steps that are executed in a given order, called process flow. A model includes symbols for steps to describe the process. The model is validated by a computer system that performs model validation in a computation order that is called control flow. In an example embodiment, the control flow is based on a depth-first traversal of the model and corresponds in most parts to the process flow. Depth-first traversal definitions are known in the art. Persons of skill in the art can, based on the teachings herein, apply a control flow that follows a different direction.

A valid model is a model for which the process can be executed with all its steps. The distinction into process and model does, however, not exclude the possibility that a process is directly executed by a computer system that reads the model, such as in a computer system that executes a process by calling web-services based on an underlying model.

FIG. 1 is a block diagram of a computer system 100 with model validation functionality. Being implemented by one or more computers, system 100 comprises standard hardware elements such as memory (M) 110, processor (P) 120, and input/output (I/O) 130. The hardware elements are symbolized by dotted lines. The hardware elements support components such as model input manager (MIM) 150, model checking engine (MCE) 160, and user interface (UI) 170.

MIM 150 receives and stores the model and information related to the model such as indicators, variables, and annotations, for example, in memory fields. MIM 150 collectively stands for arrangements in the computer system to hold information that the description refers to as, for example, graph, node, edge, link, step, structure (start/end, split/merge), annotation, pre/post-conditions, logical statement, process model, etc. Optionally, MIM 150 is coupled to a model repository for re-using models or parts thereof.

MCE 160 performs model validation according to example embodiments explained below, with the 2 main approaches: initial state reduction and variable propagation.

UI 170 is provided to let a human user (e.g., the process designer) create the model. UI 170 is also provided to communicate validation results to the user. The results include, for example, the identification of non-executables steps and/or conflicts so that the user can modify the model if needed.

For convenience, the description now refers to examples that look into processes models with steps and conditions that lead to execution or non-execution of steps.

FIG. 2 is a first example process model 200, given in 3 drawings with slightly different granularity. In the examples of the figures, models are illustrated as directed graphs with nodes and edges. The nodes are circles to symbolize process start and process end, rectangles to symbolize process steps, and diamonds to symbolize splits or merges in the process flow. The edges are arrows to symbolize links and paths in that steps are executed in a given order.

In the example, the direction of the arrows (e.g., left to right) indicates the sequential order in which the steps would be executed during process execution. However, the length of the arrows and the size of the rectangles are not indicative of the duration of process execution. Example embodiments of the computer system concentrate on process/model validation in terms of process/model executability, without requiring checking of all theoretically possible executions of the process.

In other words, model 200 (and the models in the other figures) includes a directed graph with nodes that are associated with process steps (and with start/end, split/merge structures), and edges that are associated with the flow of execution of the process steps.

During model validation, an example embodiment of the computer system (cf. MCE 160) reads the model, in particular the information related to nodes and edges (i.e. variables and annotations) in an order that corresponds to the direction given by the arrows (forward direction). This order by which validation actions are performed will be referred to as control flow.

As in FIG. 2a, model 200 has first path 201 (link 231) going from start 220 to split structure 221, second path 202 from split structure 221 to merge structure 222 (via link 232, step 211, link 233, step 212, link 234), third path 203 (in parallel to 202, via link 235, step 213, link 236), and fourth path 204 (link 237) leaving merge structure 222 to reach end 223.

Illustrating the model in such a graph is convenient for users; however, the model can be given otherwise, for example, by verbal instructions in a natural language: "When you receive instructions to start the process, start executing the first step and the third step. When you have completed the first step, continue with the second step. When you have completed the second step and the third step, finish." In these instructions, the word "and" indicates that some steps are executed in parallel, and the word "when" indicates that a step depend on conditions.

The model can also be given in a computer-readable language, for example:

| | |
|---|---|
| if start-instruction completed | ; path 201 |
|    do in parallel: | |
|       do in sequence: (step 211, do step 212) | ; path 202 |
|       do step 213 | ; path 203 |
| if (step 212 completed) AND (step 213 completed): | |
| finish | ; path 204 |

Further examples include workflow languages such as Business Process Modeling Notation (BPMN), Event-driven Process Chain (EPC), or Unified Modeling Language (UML). The model could be given in a further form, for example in a spreadsheet table.

As mentioned above, models are usually created and modified with collaboration between process domain experts and computer domain experts. The domain expert might prefer the verbal instructions, the computer expert might prefer the graph (as in FIG. 2) or the computer-readable language. In an example embodiment, computer system 100 can switch between these forms automatically. In other words, system 100 can receive the model in multiple forms.

To enhance understanding between the experts, in an example embodiment, system 100 (with its user interface 170, cf. FIG. 1) allows users to create and modify the model in a graphical form, so that persons of different skill levels can operate the system as process designers.

Briefly returning to FIG. 2a, the description introduces some further conventions. According to an example embodiment, model 200 (and the models explained below) has incoming links symbolizing that the control flow reaches a node (i.e. split/merge, steps, end) and outgoing links symbolizing that the control flow leaves a node (i.e. start, split/merge, steps). In terms of nodes and edges: an incoming link is an edge entering a node, and an outgoing link is an edge leaving a node. Since links usually combine nodes, most links have a dual function to be outgoing links and incoming links, for different nodes.

Further, the number of incoming and outgoing links may be restricted for each node type: The single start node (e.g., start 220) has no incoming link, and has exactly one outgoing link (e.g., link 231). The single end node (e.g, end 223) has exactly one incoming link (e.g., link 237), but has no outgoing link. Each step (e.g., step 211) has exactly one incoming link (e.g., link 232) and exactly one outgoing link (e.g., 233). A split structure (e.g., 221) has exactly one incoming link (e.g., link 231) and more than one outgoing links (e.g., split 221 with 2 links 232 and 235). A merge structure (e.g., 222) has more than one incoming links (e.g., links 234 and 236 to merge 222) and exactly one outgoing link.

Further, FIG. 2a generally refers to split structure 221 and merge structure 222 as structures that distribute or combine the process flow. There is however, a further distinction to introduce: the structures can be parallel structures, or can be XOR-structures.

Parallel structures, in figures sometimes symbolized by a + sign (cf. FIG. 2, 5), distribute and combine the flow for executing steps in parallel, such as explained in the example. In other words, split 222 is a parallel split, and merge 222 is a parallel merge.

As already mentioned above in connection with citing the model in computer-readable language, merge structure 222 (parallel merge) is a kind of AND-statement: the control flow continues when both steps 212 and 213 are completed.

Exclusive OR (XOR) structures, in figures sometimes symbolized by an X sign, let the control flow execute steps in either one path or another path. Such structures are referred to as XOR-split and XOR-merge.

Figure 2B:
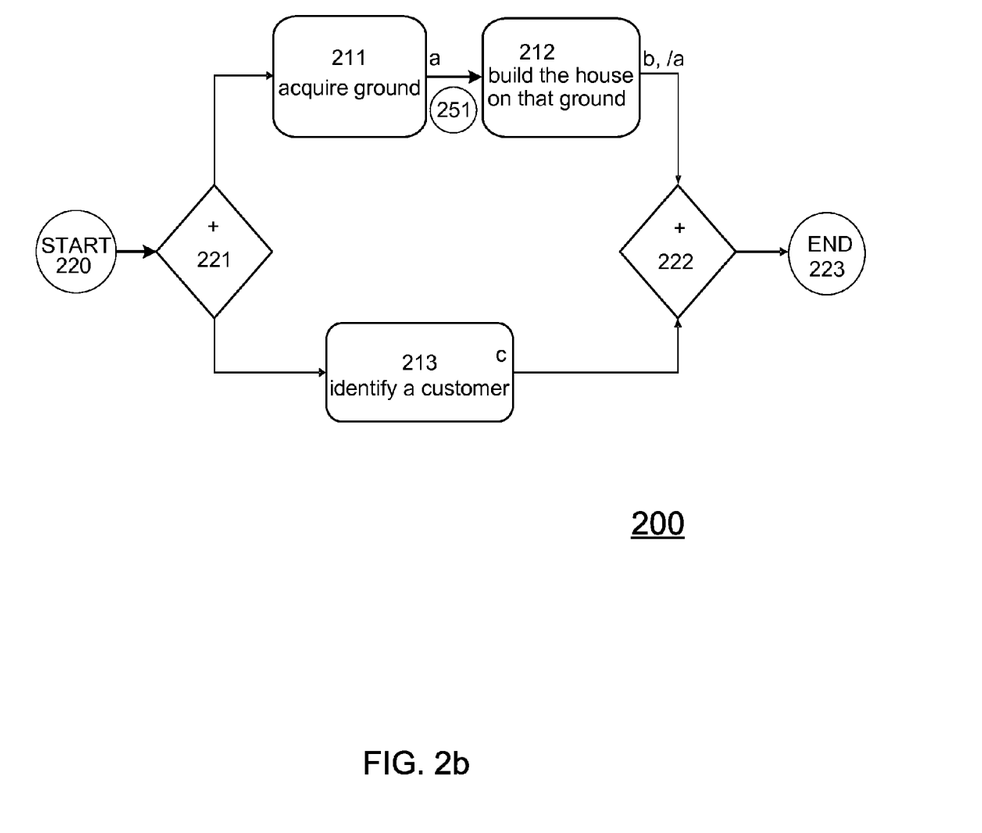
Figure 2C:
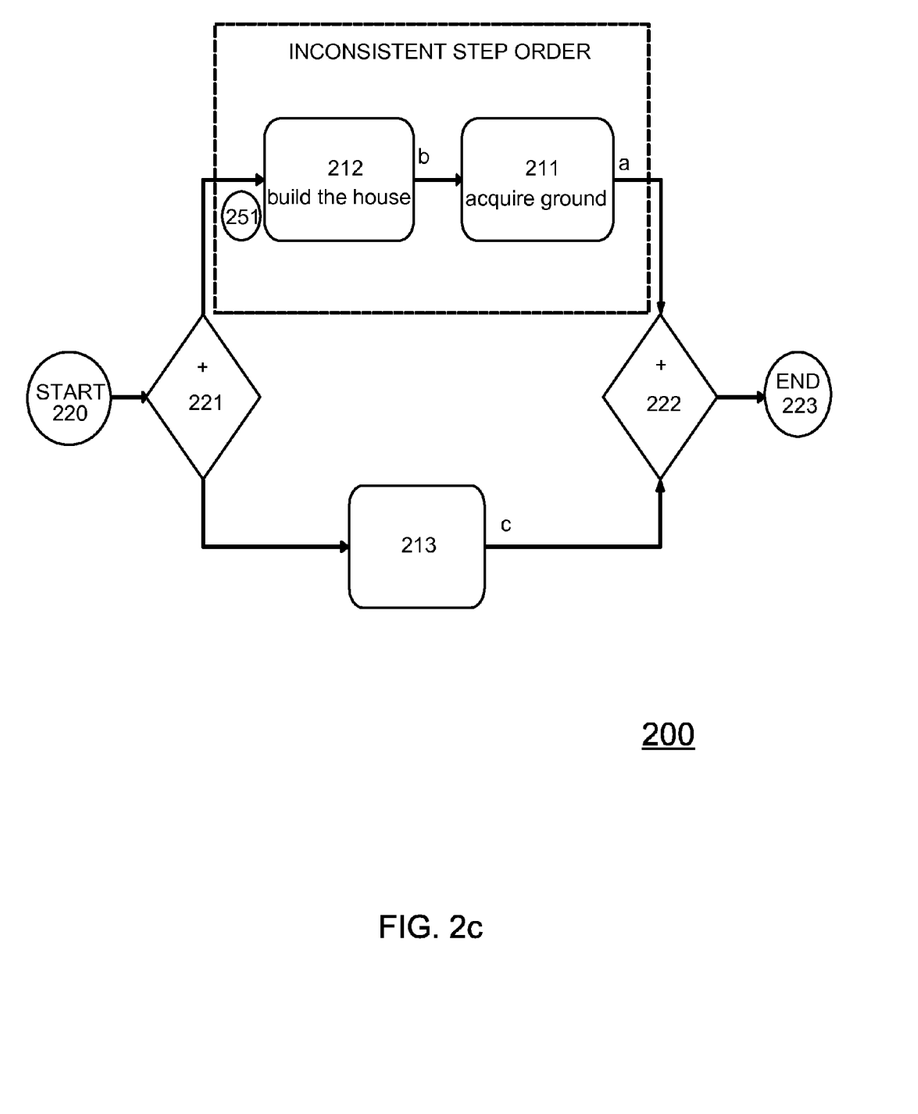

Details for the model follow in view of a business process, for illustration purposes with a consistent step order in FIG. 2b and with an inconsistent step order in FIG. 2c.

As in the example of FIG. 2b, model 200 stands for a business process that includes activities (steps) that serve the creation of a product or service. The business process may be initiated by one or more events and may be completed through one or more events, and may be based on an organizational structure. Thus, a business process may include steps or activities that need to be executed in a certain order to reach a predetermined goal.

According to an example embodiment, the business process can be executed in an enterprise that sells houses to customers. Very much simplified, the enterprise has an organizational structure with a technical department and a marketing department. Upon deciding to sell a new house (start event 220 leading to the first path), the process flow is distributed in parallel (split structure 221) to the technical department for acquiring a ground (i.e. real estate, building allotment) and consequently building the house on that ground (steps 211, 212), and distributed to the sales department for identifying a customer (step 213). When both departments have completed the activities, the house is ready to be sold to the customer and the process is completed (the path following merge 222, end 223).

In this very much simplified example, the words "acquire", "build" and "customer" have been selected to fit the variables A, B and C.

In an example embodiment, system 100 uses step conditions that include semantic information, for example, that the ground needs to be acquired before building the house. Such information is conveniently attached to the in-coming and out-going arrows of the steps. Or, in other words and more tailored to computer systems: variables and pre/post conditions are related to the graph with its nodes and edges.

An edge leaving a node (e.g., outgoing link from a step) can be related to a post-condition. For example, in FIG. 2, step 211 can set the variable A to logical "true" (for acquisition of ground completed). Since this variable is applicable when a step is linked to its successor, the variable can conveniently be related to the step's outgoing link. In other words, in the particular example of FIG. 2b, outgoing links set variables to "true", step 211 sets A to a (e.g., ground acquired), step 212 sets B to b (e.g., house built), and step 213 sets C to c (e.g., customer identified).

An edge entering a node (e.g., incoming link to a step) can be related to a pre-condition. For example, step 212 can be linked to condition 251 in a way to communicate a variable value to determine if the step can be executed or not. For example, for A being "true", the ground has been acquired so that the house can be built (step 212).

In an example embodiment, it is convenient to limit the post-conditions and the pre-conditions to the steps. In other words, conditions are not required for start/end and split/merge structures.

As in the example of FIG. 2c, model 200 stands for the business process with an inconsistent step order. For example, inconsistencies may be accidentally introduced by the user. As illustrated by a dashed frame, steps 211 and 212 have been replaced. Condition 251 remains related to step 212: but the variable A is not yet defined, A could be "true" or could be "false". In terms of the process, there are initial situations where ground has been acquired (a) or not acquired (/a).

The simplified models of FIGS. 2b and 2c may be validated by an expert manually. The expert could consider the precondition (step 212, condition 251). Eventually, the expert would find a post-condition that building the house (step 212) results in using the ground, so that as a result of step 211 the variable A should be set to "false".

The expert could also analyze potential values for the variables, that could be available initially (at start): for example, for {a b /c}, the house would have been built, but the customer is still missing, for {a /b c}, there would be a customer (c) asking for a house to be built (/b) on a available ground (a).

The expert might also recognize the inconsistent step order (of FIG. 2c). For some initial states, where the variable A is "true", the process could still be executed.

The number of initial states is exponentially related to the number of variables; in the example, there are 3 variables resulting in 8 initial states (3 to the power of 2). This does not yet consider the pre-conditions and post-conditions.

The description will continue with more complex example models, that are more suitable for processes in that some or all steps are executed by computer programs, for example, by web services. Note that with increasing complexity, shifting the validation to computer systems (such as to system 100) becomes mandatory.

In the example embodiment, a primary goal of validation is the detection of processes that are not executable. A process is considered non-executable if at least one step is not executable. A step is not executable under, for example, the following circumstances:

(i) One or more variables set a logical statement in the step pre-condition to "false". As in the example of FIG. 2bc, a house can not be built on missing ground.

(ii) The pre-condition of the step is unclear in the sense that, for example, the logical value for one or more variable is not available, so that the logical value of the pre-condition can not be determined.

The system can point out conflicts to the user (e.g., via UI 170), so that model and process can be adjusted at an early state of development.

Example embodiments perform model validation with a reduced set of initial states. In view of the mentioned preconditions, it is useful to investigate the pre-conditions, and to investigate the post-conditions (that are pre-conditions for subsequent steps).

Figure 3:
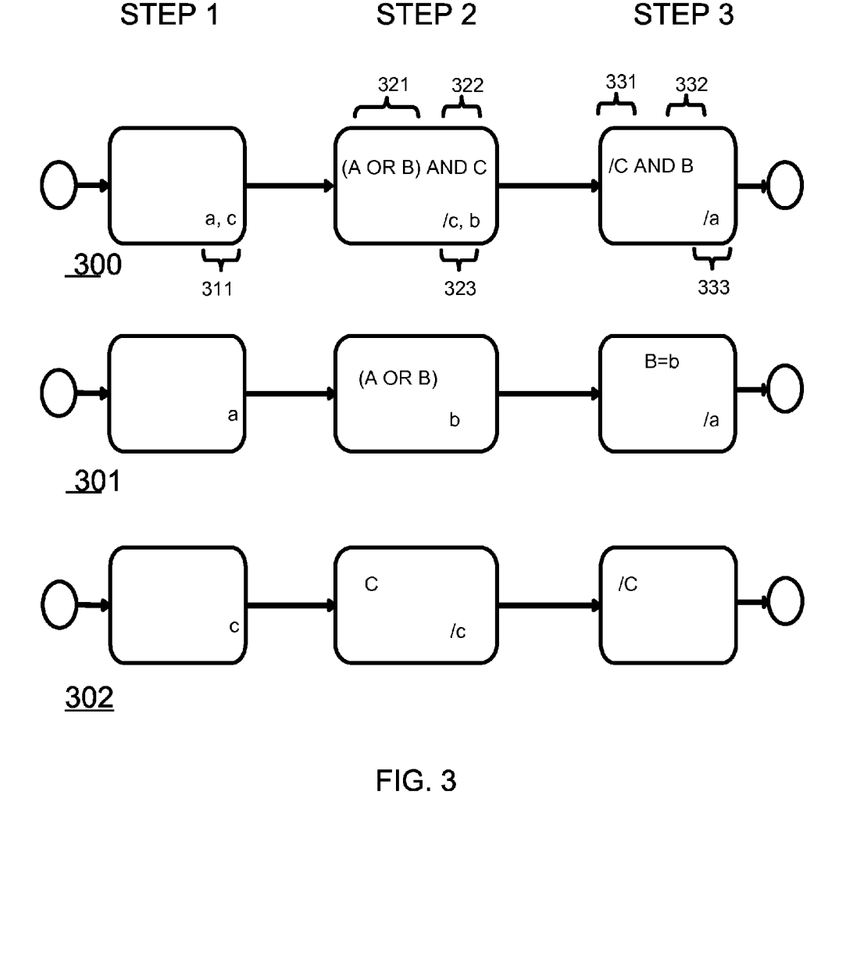
FIG. 3 is a second example process model according to an example embodiment.

FIG. 3 is a second example process model 300. Compared to the first example (in FIGS. 2abc), the steps are arranged in linear order. However, there are more pre-condition and post-condition variables. Again, the steps are illustrated by rectangles. Pre-conditions 321/322, 331/332 are shown at the left upper corners, and post-conditions 313, 323, 333 (or effects or results) are shown at the right lower corners. A circle at the left illustrates the start of the process and a circle at the right illustrates the end of the process. Note that the example variables are different from that of FIG. 2.

Step 1 has no pre-conditions, and results in variables A and C (post-condition 311, i.e. both with logical "true" values: a, c). Step 2 has the pre-condition 321/322 that execution is only possible if the logical statement "(A OR B) AND C" is "true". Step 2 results in value /c (post-condition 323, i.e. C "false") and b (i.e. B "true"). Step 3 has the pre-condition 331/332 that execution is only possible if the logical statement "/C AND B)" is "true". Step 3 results in value /a (post-condition 333).

Looking at the initial states, prior to executing step 1, the 3 variables can have the following value combinations {a b c}, {a b /c}, {a /b c}, {a /b /c}, {/a b c}, {/a b /c}, {/a /b c}, or {/a /b /c}. In other words, there are 8 different initial states.

According to an embodiment, the number of initial states (for control flow check) can be reduced (as mentioned, initial state reduction). Assuming that system 100 (cf. FIG. 1) has received this model and starts the validation by reducing the number of initial states of variables along the following:

As mentioned, a process is NOT executable of at least one step is not executable. It is convenient to look at the variables that are used in logical statements that are pre-conditions. Following the control flow (steps 1, 2, 3 in consecutive order), step 1 does not have a pre-condition (execution is possible for all value combinations); step 2 has a pre-condition that uses the variables A, B, and C; and step 3 has a precondition that uses the variables C and B.

Using a variable in statements can include that a variable can be "true" or "false".

|   | Step 1 | Step 2 | Step 3 |
|---|--------|--------|--------|
| A |        | used   |        |
| B |        | used   | used   |
| C |        | used   | used   |

Since the validation seeks to identify steps that can not be executed, variable values that set the statement (i.e. step pre-condition) to "false" are identified. Also, it is useful to investigate if variables alone or in combination contribute to "false".

The pre-condition of step 2 has 2 logical sub-statements: the first sub-statement 321 (A or B) and the second sub-statement 322 with variable C. Since both sub-statements are conjunctively related (AND), if one of the sub-statements is "false" then the pre-condition is "false", that is the case for (A or B) = "false" lines (3) and (4) and for /c (C "false") (2).

|     | (A or B) (first) | C (second) | pre-condition will be |
|-----|------------------|------------|-----------------------|
| (1) | "true"           | "true"     | "true"                |
| (2) | "true"           | "false"    | "false"               |
| (3) | "false"          | "true"     | "false"               |
| (4) | "false"          | "false"    | "false"               |

In other words, for step 2, the questions whether a variable ALONE can negate (set "false") can be positively answered for variable C. Yes, as in line (2) if C is "false" then the precondition is "false", but A and B do not matter.

For variables A and B, the answer is different: No, as in line (8) in combination with lines (3) and (4), both variables would need to be "false". Variable A ALONE can not set the first sub-statement to "false", variable B ALONE can not set the first sub-statement to "false".

|     |        | (A or B) |
|-----|--------|----------|
| (5) | a b    | "true"   |
| (6) | a /b   | "true"   |
| (7) | /a b   | "true"   |
| (8) | /a /b  | "false"  |

Therefore, for step 2 the variables A, B can be separately considered from variable C. In other words, there are 2 groups of independent variables: the first group with variables A, B and the second group with variable C. Variables A and B in the first group depend on each other.

The pre-condition of step 3 has /c and B conjunctively related (AND). If C is "true" or if B is "false", the pre-condition is "false". The variable B can be separately considered from variable C. In other words, the variable B alone can set the pre-condition to "false" (for B "false"), and variable C alone can set the pre-condition to "false" (for C "true").

|      | B       | C       | pre-condition /C AND B will be |
|------|---------|---------|--------------------------------|
| (9)  | "true"  | "true"  | "false"                        |
| (10) | "true"  | "false" | "true"                         |
| (11) | "false" | "true"  | "false"                        |
| (12) | "false" | "false" | "false"                        |

There are again 2 groups of independent variables: the first group with variable B and the second group with variable C.

The groups for the steps can be combined: the first group with variables A and B, the second group with variable C.

|         | step 1 | step 2 | step 3 | model |
|---------|--------|--------|--------|-------|
| group 1 | N/A    | A, B   | B      | A, B  |
| group 2 | N/A    | C      | C      | C     |

The process model 300 is now separated into sub-model 301 for the first group of variables (A, B), and sub-model 302 for the second group of variables (C). If both sub-models are valid, the overall process would be executable.

In model 301, step 1 does not have a pre-condition, sets variable A to "true"; step 2 has the condition (A OR B) and sets variable B to "true"; step 3 has the condition B, and sets the variable A to "false" (/a). Model 301 is valid, because the transition from 1 to 2 (variable A=a as required in step 2) is valid; and because the transition from 2 to 3 is valid as well (variable B=b as required in step 3).

In model 302, step 1 does not have a pre-condition, but sets variable C to c ("true"); step 3 has the condition c (C "true") and sets variable C to "false" (/c); step 3 has the condition C "false" (/c). Model 302 is valid, because the transitions from 1 to 2 (variable c) and from 2 to 3 (/c) are valid.

Looking at the initial states, in model 301 the variables can have the values {a b}, {a /b}, {/a b} and {/a /b}, that means 4 different states; in model 301 the only variable can have the values {c} and {/c}, that means 2 different states.

The overall number of states for both sub-models 301 and 302 is 4+2=6 that is less than the number of states (8) for the original model 300.

In other words, the number of initial states (that would need to be considered during model checking) had been reduced.

Shortly returning to true/false tables, and the questions whether a variable alone can negate a pre-condition, the description now looks at this in a more general sense.

In other words, a first variable (e.g., A) depends on a second variable (e.g., B) if the second variable is necessary to decide (by logical operations) whether the first variable causes a step pre-conditions to be "false" (so that the step is not executable).

As described, conditions are related to steps, but—more in general—conditions can be related to nodes and edges of a process model in the sense that a first variable depends on a second variable if the second variable is necessary to decide (by logical operations) whether the first variable causes an element of the graph (e.g., node, edge) to assume a logical value (e.g., "false") such that this element in the graph makes the process model at least partially non-executable.

This is, for example, the case if, e.g.:
(a) (as mentioned) the element that assumes the logical value is a step making the execution of a subsequent step impossible (e.g., negating its pre-condition);
(b) the element that assumes the logical value is a conditional link that would not allow the process flow to continue so that a step becomes unreachable;
(c) the element that assumes the logical value is an XOR split structure with a conditional outgoing link that would no longer be operational; or
(d) the element that assumes the logical value causes a value change of the first variable in a post-condition of a step.

Figure 4:
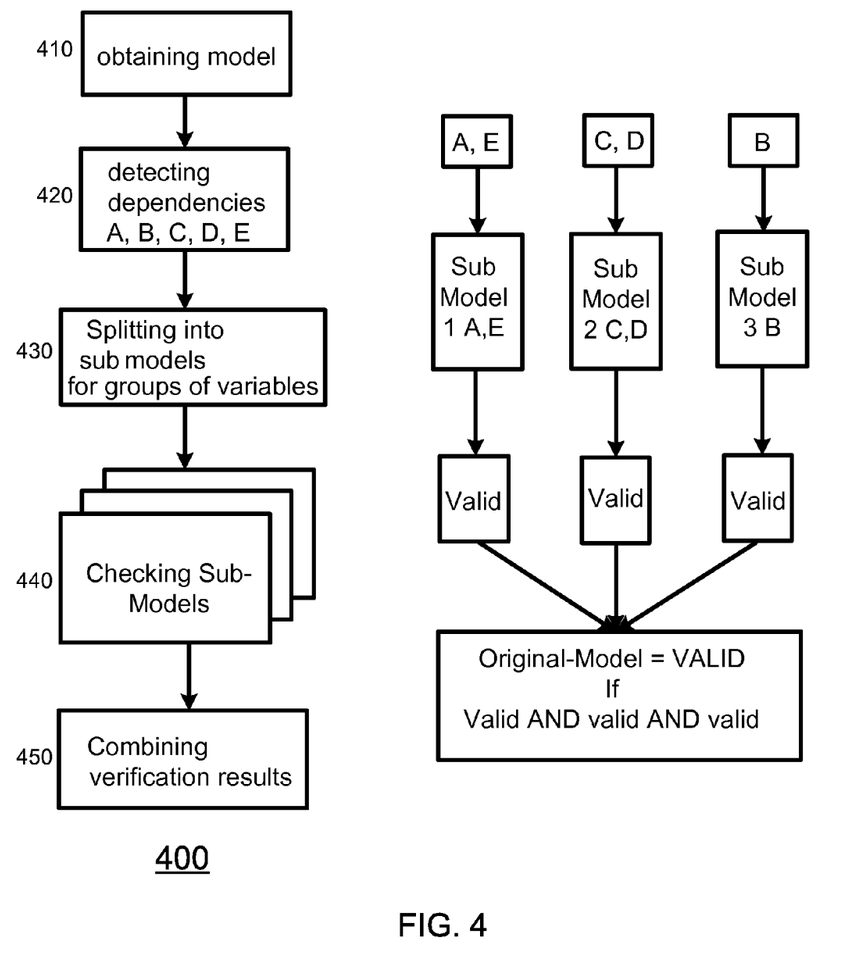
FIG. 4 is a flowchart diagram of a method using initial state reduction.
Figure 5:
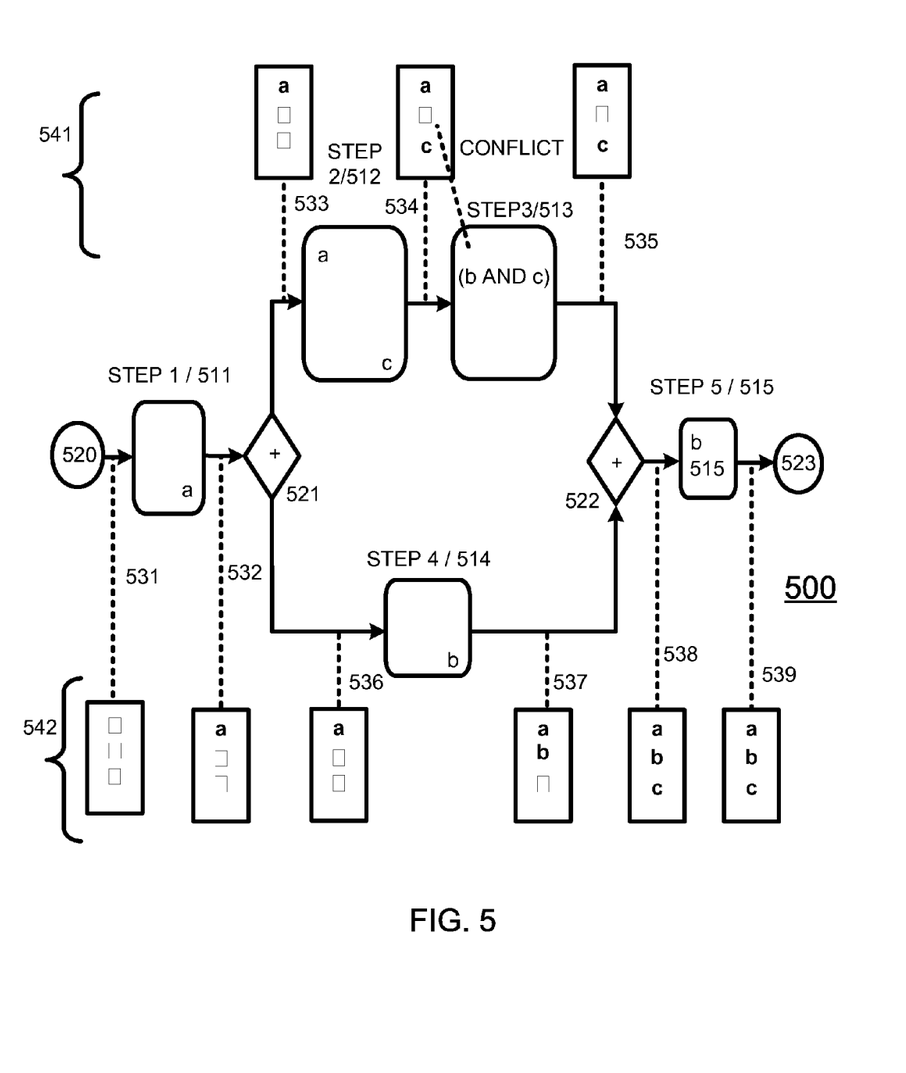
FIG. 5 is a third example process model according to an example embodiment.

FIG. 4 is a flowchart of a method using initial state reduction. Method 400 for operating a computer system, with processor and memory.

In obtaining a process model (410), the computer system receives a model that has (a) a directed graph with nodes that are associated with process steps, and with edges that are associated with the flow of execution from predecessor steps to successor steps, (b) boolean pre-conditions and post-conditions, such that a post-condition of the predecessor step can be the pre-condition for execution of a successor step, and (c) boolean variables to determine logical values of the conditions.

In detecting dependencies (420), the computer system detects dependencies between variables that are required to determine the logical values of the pre-conditions.

In splitting the model (430), the computer system splits the model into sub-models so that dependent variables remain within sub-models.

In checking the flow of execution (440), the computer system checks the execution flow (of the process) with pre-conditions and post-conditions for possible combinations of the dependent variables for each sub-model separately.

In case the check of the sub-models results in inconsistencies, such inconsistencies can be communicated to the user (cf. UI 170) of the system so that he/she can modify the sub-model.

It is also possible to combine check results of the sub-models. Optionally, in step 450 the verification results for the sub-models are combined. Details are illustrated in the right side of the figure: checking 3 sub-models for variables A, E (first sub-model), C, D (second sub-model) and B (third sub-model) can result in all 3 sub-models being verified to have a correct process flow. The original model (i.e, the model with all variables A, B, C, D, and E would then have a valid process flow.

In other words, in an example embodiment, a sub-model is evaluated to be valid if the checking the flow of execution results that the steps of the sub-model can be executed. Further, the model (i.e. the overall model) is evaluated to be valid in its completeness if the sub-models are evaluated to be valid.

In an example embodiment, obtaining the model includes that the variables determine the pre-conditions to assume a first logical value (e.g., "true") for that a step can be executed, or to assume a second logical value (e.g., "false") for that a step can not be executed.

In an example embodiment, detecting dependencies includes detecting a first variable to be dependent from a second variable if the first variable alone is not sufficient to determine the pre-condition to assume the second logical value.

In an example embodiment, obtaining the model includes that the pre-conditions are logical statements with sub-statements that are related by conjunctive (i.e. AND) clauses.

In an example embodiment, detecting dependencies includes that a first variable is independent from a second variable if the first variable alone is sufficient to determine one of the sub-statements to assume logical value that forces the statement of the pre-condition as a whole to assume the second logical value.

In an example embodiment, detecting and checking are performed in the order of a control flow that is determined by the direction of the graph.

In an example embodiment, detecting and checking are performed in the order of the control flow that is determined by depth-first traversal.

Having explained initial state reduction as a first validation approach, the description now refers to FIG. 5 to explain variable propagation as a second validation approach.

Supposing the model has been checked for the absence of pre-condition and post-condition conflicts (the check with or without initial state reduction), validation can continue by (first) relating the steps to pre-conditions, by (second) in the order of the control flow (step by step), relating the links to annotations that are completed with variables according to principles that consider step execution results (principles for creating the annotations), and (third) detecting the absence of a variable in an annotation to a link that lead to a step in that the variable is part of the pre-conditions.

Such an absence points to invalidity of the step in the model (principle for using the annotations) as a result of this validation.

FIG. 5 is a third example process model 500. Compared to the first and second examples (in FIGS. 2-3), further steps had been introduced. Again, the example variables are different from that of the other figures. Similar to the above explained examples (FIGS. 2-3), model 500 has steps in combination with start/end and parallel split/merge structures, as well as links.

The control flow can be summarized as follows: Start 520 leads to step 1 (511) via link 531. Step 1 leads to parallel split structure 521 via link 532. From there, a first branch goes via link 533 to step 2 (512), link 534, step 3 (513), link 535 to merge structure 522. In parallel, a second branch goes from split structure 521, via link 536, step 4 (514), link 537 to parallel merge structure 522. The flow continues at structure 522 and goes via link 538, step 5 (515), and link 539 to end 523.

Links 531-539 are related to annotations. The annotations are conveniently implemented in memory (e.g., in MIM 150, FIG. 1). For simplicity, FIG. 5 shows the links and the annotations with the same reference numbers. In the example, the annotations are empty (e.g., 531 {⊥ ⊥ ⊥}) or partly/completely filled with "true" values of variables (532-529). In an example embodiment, "false" values can also be annotated.

Annotations 533-535 (illustrated above the flowchart) and annotations 531-532/536-539 (illustrated below the flowchart) are conveniently implemented separately, for example, by memory fields 541 and 542. In the example, the annotations are to be completed by up to 3 values, they can be regarded as sets or vectors of variables; in the example, the vector has 3 variables: {A B C} because these 3 variables result from steps (post-conditions).

Annotations can be partly/completely empty, where values for a variables are not set (not "true", not "false"), this is illustrated by the above-mentioned "⊥" symbol.

As mentioned, the annotations are completed in memory following the control flow of the model (in the figure moving from left to right).

The basic principles for creating the annotations may include:

Principle 1: A variable is set to "true" if that is the post-condition of the preceding step (or start/split/merge), for example, in annotation 532 the variable A is set to "true" because step 511 results in A being "true". In annotation 534 the variable C is set to "true" because step 512 results in being "true". In annotation 537 the variable B is set to "true" because step 514 results in B being "true".

Principle 2: A step without a post-condition (i.e. not changing a variable) keeps an annotation unchanged; for example, annotation 535 after step 513 is the same as annotation 534 before that step 513.

Principle 3: If an annotation before a step has a variable set to "false" and a step from a parallel path results in a logical "true" for that variable, the variable is removed from the annotation. In other words, conflicting entry "true" and "false" from parallel paths keep an annotation (neither "true" or "false").

Principle 4: Split structures take over the annotations from the incoming links to the outgoing links, for example, structure 521 has its incoming annotation identical to its outgoing annotations {a ⊥ ⊥}.

Principle 5: For XOR structures (not illustrated in FIG. 5), the annotations of the outgoing link is the intersection of the incoming links.

Principle 6: For parallel joins (i.e. merge structure 522 in FIG. 5), the outgoing link is the union of all incoming links. For example, the incoming annotations to merge structure 522 are annotation 535 {a ⊥ c} and annotation 537 {a b ⊥}. The union {a b c} is the outgoing annotation 538.

Principle 7: every variable that holds at an incoming link of a parallel join also holds at its outgoing link.

Returning to the above-mentioned principle for using the annotations, a variable that is absent in an annotation but that is required as pre-condition of that step points to a conflict and to non-executabiltiy of that step. In the example, annotation/link 534 is prior to step 513, in the annotation, the variable B is absent (⊥ symbol, no indication of "true" or "false"), but the variable B ("true") is required in the pre-condition for the step. The process—when executed—would eventually stop at step 513 because the variable B is not set to "true".

More in detail, the principles are applied in model 500 as follows:

At start 520, memory fields 541 and 542 for annotation do not yet carry any variables.

Step 1 (511) sets variable A to "true", hence memory 542 switched to link annotation 532 {a ⊥ ⊥}, principle 1.

At split structure, annotation 532 is taken over to both memory fields 541/542 so that outgoing annotations 533 and 536 remain {a ⊥ ⊥}, principle 4.

At step 4 (514), annotation 536 is enhanced by variable b (resulting from the step) so that outgoing annotation 537 results in {a b ⊥}, principle 1.

At step 2 (512), annotation 533 is enhanced by variable c (resulting from the step) so that outgoing annotation 534 results in {a ⊥ c}, principle 1.

At step 3 (513), annotation 533 is taken over to outgoing annotation 535, unchanged because the step has no post-conditions, principle 2.

At merge structure 522, the incoming annotations are annotation 535 in field 541 {a ⊥ c} and annotation 537 in field 542 {a b ⊥}. The outgoing annotation 538 is the union {a b c} in, for example, memory field 542, principle 6.

At step 5 (515) to end 523, the annotations 538/539 remain unchanged {a b c}, principle 2.

Implementations of the various techniques described herein may be implemented in digital electronic circuitry, or in computer hardware, firmware, software, or in combinations of them. Implementations may implemented as a computer program product, i.e. a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for process model validation, the method being performed by at least one processor, the method comprising:
    obtaining a process model, the model having
    (a) a directed graph with nodes that are associated with process steps, and with edges that are associated with a flow of execution from predecessor steps to successor steps,
    (b) pre-conditions and post-conditions associated with the process steps, such that a post-condition of a predecessor step of the predecessor steps can be a pre-condition for execution of a successor step of the predecessor step, and
    (c) variables to determine logical values of the pre-conditions and the post-conditions, the variables including a first variable, a second variable, and a third variable associated with the pre-condition of the successor step;
    performing process model validation on the obtained process model, the process model validation including detecting at least one process that is not executable, wherein the at least one process is non-executable if at least one process step is not executable,
    wherein the performing process model validation includes reducing a number of initial states associated with the process model, the number of initial states being dependent on a number of the variables, the pre-conditions, and the post-conditions, wherein the reducing the number of initial states includes:
    detecting dependencies between the variables that are required to determine the logical values of the pre-conditions including detecting the first variable to be dependent from the second variable if the first variable alone is not sufficient to determine a logical value of the pre-condition as false, and detecting the third variable to be independent from the first and second variables if the third variable alone is sufficient to determine the logical value of the pre-condition as false, and
    splitting the model into sub-models so that dependent variables remain within sub-models including a first sub-model and a second sub-model, the first sub-model including the first variable and the second variable, and the second sub-model including the third variable,
    wherein the performing process model validation includes checking the flow of execution with the pre-conditions and the post-conditions for possible combinations of the dependent variables for each sub-model separately including evaluating a sub-model of the sub-models to be valid if the checking of the flow of execution indicates that the steps of the sub-model can be executed and evaluating the model to be valid if the sub-models are evaluated to be valid.

2. The method of claim 1, wherein the logical value of pre-condition as false indicates that the associated successor step cannot be executed.

3. The method of claim 1, wherein obtaining the model includes that the pre-condition associated with the successor step includes a first logical sub-statement and a second logical sub-statement related by a conjunctive AND clause.

4. The method of claim 3, wherein detecting dependencies includes detecting that the third variable is independent from the first variable and the second variable when the third variable alone is sufficient to determine one of the first logical sub-statement and the second logical sub-statement to be the false logical value thereby forcing the pre-condition as a whole to assume the false logical value.

5. The method of claim 1, wherein detecting and checking are performed in the order of a control flow that is determined by a direction of the graph.

6. The method of claim 5, wherein detecting and checking are performed in the order of the control flow that is determined by depth-first traversal.

7. A computer program product, tangible embodied on a non-transitory computer-readable medium, the computer program product being configured to cause a data processing apparatus to:
    obtain a process model, the model having
    (a) a directed graph with nodes that are associated with process steps, and with edges that are associated with a flow of execution from predecessor steps to successor steps,
    (b) pre-conditions and post-conditions associated with the process steps, such that a post-condition of a predecessor step of the predecessor steps can be a pre-condition for execution of a successor step of the predecessor step, and
    (c) variables to determine logical values of the pre-conditions and the post-conditions, the variables including a first variable, a second variable, and a third variable associated with the pre-condition of the successor step;
    the product further configured to:
    perform process model validation on the obtained process model, the process model validation including detecting at least one process that is not executable, wherein the at least one process is non-executable if at least one process step is not executable,
    wherein the process model validation includes reducing a number of initial states associated with the process model, the number of initial states being dependent on a number of the variables, the pre-conditions, and the post-conditions, wherein the reducing the number of initial states includes:
    detecting dependencies between the variables that are required to determine the logical values of the pre-conditions including detecting the first variable to be dependent from the second variable if the first variable alone is not sufficient to determine a logical value of the pre-condition as false, and detecting the third variable to be independent from the first and second variables if the third variable alone is sufficient to determine the logical value of the pre-condition as false, and
    splitting the model into sub-models so that dependent variables remain within sub-models including a first sub-model and a second sub-model, the first sub-model including the first variable and the second variable, and the second sub-model including the third variable,
    wherein the performing process model validation includes checking the flow of execution with the pre-conditions and the post-conditions for possible combinations of the dependent variables for each sub-model separately including evaluating a sub-model of the sub-models to be valid if the checking of the flow of execution indicates that the steps of the sub-model can be executed and evaluating the model to be valid if the sub-models are evaluated to be valid.

8. The computer program product of claim 7, wherein the logical value of pre-condition as false indicates that the associated successor step cannot be executed.

9. The computer program product of claim 7, wherein in the model the pre-condition associated with the successor step includes a first logical sub-statement and a second logical sub-statement related by a conjunctive AND clause.

10. The computer program product of claim 9, wherein the computer program product is configured to cause the data processing apparatus to detect dependencies such that the third variable is independent from the first variable and the second variable when the third variable alone is sufficient to determine one of the first logical sub-statement and the second logical sub-statement to be the false logical value thereby forcing the pre-condition as a whole to assume the false logical value.

11. The computer program product of claim 7, wherein the computer program product is configured to cause the data processing apparatus to detect and check in an order of a control flow that is determined by the direction of the graph.

12. The computer program product of claim 11, wherein the order of the control flow is determined by depth-first traversal.

13. A system comprising:
at least one processor;
a non-transitory computer-readable medium storing instructions which, when executed by the at least one processor, are configured to implement:
a model input manager (MIM) configured to obtain a process model having (a) a directed graph with nodes that are associated with process steps, and with edges that are associated with a flow of execution from predecessor steps to successor steps, (b) pre-conditions and post-conditions associated with the process steps, such that a post-condition of a predecessor step of the predecessor steps can be a pre-condition for execution of a successor step of the predecessor step, and (c) variables to determine logical values of the pre-conditions and the post-conditions, the variables including a first variable, a second variable, and a third variable associated with the pre-condition of the successor step; and
a model checking engine configured to perform process model validation on the obtained process model, the process model validation including detecting at least one process that is not executable, wherein the at least one process is non-executable if at least one process step is not executable, the model checking engine configured to reduce a number of initial states associated with the process model, the number of initial states being dependent on a number of the variables, the pre-conditions, and the post-conditions,
the model checking engine further configured to detect dependencies between the variables that are required to determine the logical values of the pre-conditions including detecting the first variable to be dependent from the second variable if the first variable alone is not sufficient to determine a logical value of the pre-condition as false, and detecting the third variable to be independent from the first and second variables if the third variable alone is sufficient to determine the logical value of the pre-condition as false,
the model checking engine further configured to split the model into sub-models so that dependent variables remain within sub-models including a first sub-model and a second sub-model, the first sub-model including the first variable and the second variable, and the second sub-model including the third variable, and
the model checking engine further configured to check the flow of execution with the pre-conditions and the post-conditions for possible combinations of the dependent variables for each sub-model separately, the model checking engine further configured to evaluate a sub-model of the sub-models to be valid if the checking of the flow of execution indicates that the steps of the sub-model can be executed and evaluate the model to be valid if the sub-models are evaluated to be valid.

14. The system of claim 13, wherein the logical value of pre-condition as false indicates that the associated successor step cannot be executed.

15. The system of claim 13, wherein the pre-condition associated with the successor step includes a first logical sub-statement and a second logical sub-statement related by a conjunctive AND clause.

16. The system of claim 15, wherein the model checking engine is configured to detect that the third variable is independent from the first variable and the second variable when the third variable alone is sufficient to determine one of the first logical sub-statement and the second logical sub-statement to be the false logical value thereby forcing the pre-condition as a whole to assume the false logical value.

* * * * *